Nov. 19, 1968     L. W. SMITH     3,411,831
DEFORMABLE AIR-CUSHIONING PNEUMATIC CONVEYOR
Filed Jan. 19, 1967
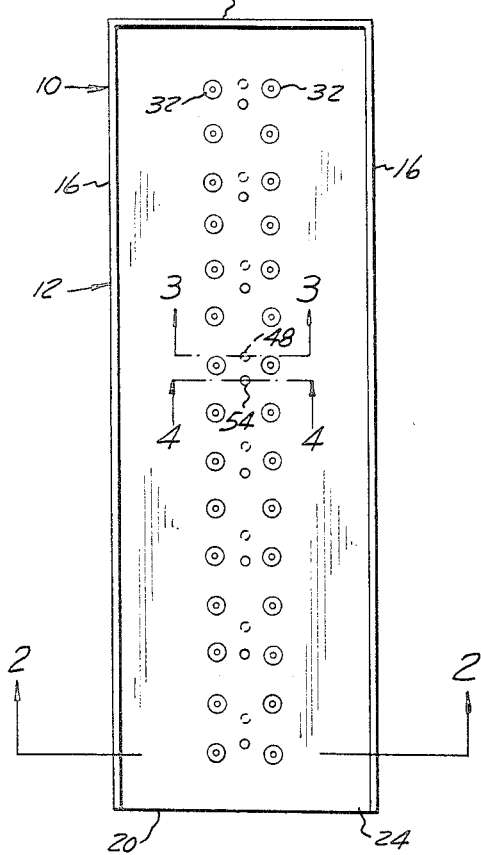
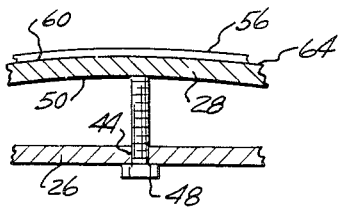
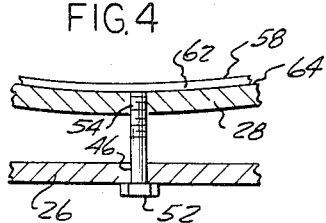
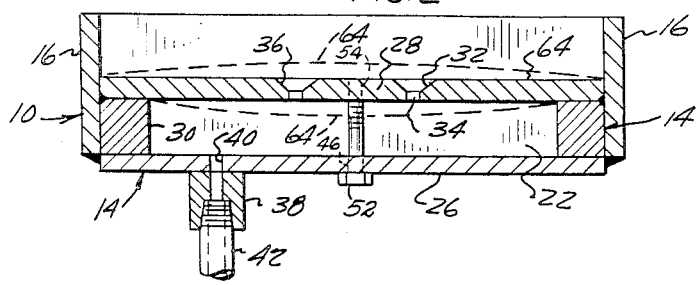
INVENTOR
LEON W. SMITH
BY *Barthel & Bugbee*
ATTORNEYS United States Patent Office 3,411,831
Patented Nov. 19, 1968

3,411,831
DEFORMABLE AIR-CUSHIONING
PNEUMATIC CONVEYOR
Leon W. Smith, 75 Henderson St.,
Pontiac, Mich. 48053
Filed Jan. 19, 1967, Ser. No. 610,350
4 Claims. (Cl. 302—31)

ABSTRACT OF THE DISCLOSURE

A deformable air-cushioning pneumatic conveyor wherein the article to be conveyed is raised above the bed of the conveyor chute by jets of compressed air discharged in an upward direction through multiple air jet openings or nozzle holes in the bed of the chute, thereby eliminating the friction between the conveyed articles and the bed of the chute so that the articles can be moved along the chute either by gravity or manually or mechanically or by forwardly-directed air jet openings with a minimum of force required. In order to minimize leakage of air between the cushion and the conveyed articles where the conveyed articles have convex or concave bottom surfaces, means is provided for deforming the conveyor bed to more nearly conform to the configuration of such bottom surfaces.

This is an improvement over the invention disclosed in my co-pending application Ser. No. 593,840 filed Nov. 14, 1966, for Air-Cushioning Pneumatic Conveyor.

Background of the invention

My above-mentioned co-pending application discloses a conveyor wherein the article or material to be conveyed is simultaneously raised above the bed of the conveyor chute and propelled forwardly along the chute by jets of compressed air discharged in an upward and forward direction through multiple air jet openings or nozzle holes in the bed of the chute. Prior conveyors are known wherein powdered materials are blown along a passageway by a horizontal air blast, such as for the feeding of powdered coal to a furnace or to the firebox of a boiler. Such installations are shown in the patent to Westlake No. 622,-935 of Apr. 11, 1899, to Myers No. 1,821,068 of Sept. 1, 1931, and Ichter No. 2,105,457 of Jan. 1, 1938. None of these employs a flat-bottomed chute with the multiple air-jet openings or nozzle holes of the applicant's present or co-pending application.

Brief summary of the invention

Briefly summarized, the invention consists of a conveyor chute having a hollow base, the top wall of which contains multiple air-jet openings or nozzle holes disposed in longitudinally and laterally-spaced relationship so as to direct compressed air jets upwardly from compressed air supplied to the manifold consisting of a hollow chamber in the chute base. The top wall of the chute base is made of deformable material, such as steel, which is adapted to be flexed either to a convex or concave configuration to more nearly fit the concave or convex bottom surfaces of articles to be conveyed so as to render the supporting air cushion between the conveyed articles and the top wall of the chute base of as nearly constant thickness as possible beneath each article.

In the drawings:

FIGURE 1 is a top plan view of a deformable air-cushioning pneumatic conveyor, according to one form of the invention;

FIGURE 2 is an enlarged vertical cross-section taken along the line 2—2 in FIGURE 1, showing in dotted lines the convex or concave deformation accomplished by the invention;

FIGURE 3 is a fragmentary view of the central portion of FIGURE 1, showing convex deformation of the top wall of the chute base by push screws; and FIGURE 4 is a view similar to FIGURE 3, but showing concave deformation thereof by pull screws.

Referring to the drawing in detail, FIGURES 1 and 2 show a deformable air-cushioning pneumatic conveyor, generally designated 10, according to one form of the invention as having a chute 12 provided with a hollow bed or base 14 having upstanding longitudinal side walls 16, a transverse rearward end wall 18 and a low forward end wall 20 enclosing an air chamber 22. Above the low end wall 20 at the forward end of the hollow conveyor base 14 is a conveyor discharge opening 24.

The hollow conveyor bed or base 14 also has a bottom wall 26, a deformable top wall 28, and spacer bars 30 disposed between them (FIGURE 2). The various components 14, 16, 18, 20, 26, 28 and 30 of the chute 12 are preferably secured to one another by welding, so as to render the air chamber 22 substantially air-tight, except for multiple air-jet openings or nozzle holes 32 disposed in laterally-spaced and longitudinally-spaced relationship in the top wall 28 of the conveyor base 14. Each nozzle hole 32 (FIGURE 2) preferably consists of a lower straight portion 34 and an upper flared portion 36. The conveyor chute base 14 is provided with an internally-threaded hollow cylindrical pipe coupling 38 (FIGURE 2) welded or otherwise tightly secured to the bottom wall 26 in line with an inlet opening 40 therein. Threaded into the pipe coupling 38 is the correspondingly-threaded end of a compressed air supply pipe 42 which in turn is connected by way of a suitable valve (not shown) to a source of compressed air or other suitable compressed gas (also not shown).

The bottom wall 26 is provided along its longitudinal center line with longitudinally-spaced multiple holes alternating in succession between threaded holes 44 (FIGURE 3) and smooth holes 46 (FIGURE 4). Threaded upward through the threaded holes 44 into engagement with the top wall 28 are the threaded shanks of screws or bolts 48 with their upper ends engaging the lower surface 50 of the top wall 28. Inserted through the smooth holes 46 in the lower wall 26 are the smooth lower portions of the shanks of screws or bolts 52 (FIGURE 4), the threaded upper end portions of which are threaded into aligned correspondingly-threaded holes 54 in the top wall 28.

In the operation of the deformable air-cushioning pneumatic conveyor 10, let it be assumed that the compressed air supply pipe 42 has been connected to a source of compressed air, and that the closed end 18 of the chute 12 has been placed at the outlet of the stamping press or other machine or source from which articles 56 (FIGURE 3) or 58 (FIGURE 4) are to be conveyed. The articles 56 are shown as illustrative of those having concave bottom surfaces 60 and the articles 58 convex bottom surfaces 62 disposed immediately adjacent the top surface 64 of the top wall 28 of the conveyor base or bed 14. If the conveyed articles have flat bottom surfaces (not shown), the top wall 28 is left in its flat condition illustrated by the solid lines thereof in FIGURE 2.

If, on the other hand, the concave-bottomed articles 56 of FIGURE 3 are to be conveyed, the operator by means of a suitable wrench or screwdriver loosens the bolts or screws 52 (FIGURE 4) to provide clearance for their heads beneath the bottom wall 26, whereupon he then tightens the screws or bolts 48 to flex the top wall 28 so that its top surface 64 becomes approximately cylindrical so as to conform as nearly as possible to the concave bottoms 60 of the conveyed articles 56. If, however, the convex-bottomed articles 58 of FIGURE 4 are to be conveyed, the operator loosens the screws or bolts 48 in a suitable direction and tightens the screws or bolts 52 in the opposite direction to exert a pull downward upon the top wall 38 so as to render its top surface 64 approximately concave cylindrical in order to conform as nearly as possible to the configuration of the convex bottom surfaces 62 of the conveyed articles 58.

In the operation of the invention, the jets of air spurt upward through their respective openings 32 (FIGURE 2) so as to provide a cushion of air between the upper surface 64 of the top wall 28, and the bottom surface 60 or 62 of the conveyed articles 56 or 58. If the chute 12 is mounted with the forward end of its top wall 28 lower than its rearward end, the conveyed articles slide by gravity downward therealong and out through the lower end opening 24 with ease and with the chute 12 only slightly inclined due to the decreased friction obtained by the invention. If, on the other hand, the top wall 28 of the conveyor chute 12 is horizontal or upwardly-inclined, the conveyed articles may be moved therealong manually or by other suitable means from the point of deposit adjacent the rear wall 18 to and through the forward end opening 24.

I claim:

1. A deformable air-cushioning pneumatic conveyor, comprising
    a chute having a rearward inlet end and a forward outlet end and a bed extending from said inlet end to said outlet end,
        said bed having a deformable top wall with multiple air-jet nozzle openings therein directed upward relatively thereto,
        said bed also having an air chamber therein communicating with said nozzle openings,
    means for supplying compressed air to said air chamber,
    and means for deforming said top wall and thereby altering the configuration thereof,
        said top wall having a substantially flat upper surface,
        said deforming means including devices associated with said bed for rendering convex the upper surface of said top wall,
        said bed having a bottom wall disposed below said top wall,
        and said deforming means including devices secured to said bottom wall for raising the central portion of said top wall,
said devices including screw-threaded holes in said bottom wall and pressure screws threaded through said holes into pressure-exerting contact with said top wall.

2. A deformable air-cushioning pneumatic conveyor, according to claim 1, wherein said screw-threaded holes and screws are disposed in a path extending longitudinally along said chute in the central portion thereof.

3. A deformable air-cushioning pneumatic conveyor, comprising
    a chute having a rearward inlet end and a forward outlet end and a bed extending from said inlet end to said outlet end,
        said bed having a deformable top wall with multiple air-jet nozzle openings therein directed upward relatively thereto,
        said bed also having an air chamber therein communicating with said nozzle openings,
    means for supplying compressed air to said air chamber,
    and means for deforming said top wall and thereby altering the configuration thereof,
        said top wall having a substantially flat upper surface,
        said deforming means including devices associated with said bed for rendering concave the upper surface of said top wall,
        said bed having a bottom wall disposed below said top wall,
        and said deforming means including devices secured to said bottom wall for lowering the central portion of said top wall,
wherein said devices including screw-threaded holes in said top wall and smooth holes aligned therewith in said bottom wall and pressure screws with smooth lower shank portions rotatably mounted in said smooth holes and with threaded upper shank portions threaded into said screw-threaded holes.

4. A deformable air-cushioning pneumatic conveyor, according to claim 3, wherein said screw-threaded holes and aligned smooth holes are disposed in a path extending longitudinally along said chute in the central portion thereof.

References Cited

UNITED STATES PATENTS

| | | | |
|---|---|---|---|
| 2,815,249 | 12/1957 | Curtenius | 214—1 |
| 3,231,312 | 1/1966 | Paton | 302—29 |
| 3,279,863 | 10/1966 | Bouladon et al. | 302—29 |
| 3,283,920 | 11/1966 | Schonfelder et al. | 302—29 X |

FOREIGN PATENTS 950,056 2/1964 Great Britain.

EVON C. BLUNK, *Primary Examiner.*

M. L. AJEMAN, *Assistant Examiner.*